(12) United States Patent
Macor

(10) Patent No.: US 7,359,505 B2
(45) Date of Patent: *Apr. 15, 2008

(54) SPACE-EFFICIENT ERGONOMIC TELEPHONY KEYPAD

(75) Inventor: James J. Macor, Jackson, NJ (US)

(73) Assignee: Proprietary Technologies, Inc.

( * ) Notice: Subject to any disclaimer, the term of this patent is extended or adjusted under 35 U.S.C. 154(b) by 329 days.

This patent is subject to a terminal disclaimer.

(21) Appl. No.: 11/169,931

(22) Filed: Jun. 29, 2005

(65) Prior Publication Data

US 2005/0238406 A1 Oct. 27, 2005

Related U.S. Application Data

(63) Continuation-in-part of application No. 10/751,084, filed on Jan. 2, 2004, now Pat. No. 6,948,869.

(51) Int. Cl.
*H04M 1/00* (2006.01)

(52) U.S. Cl. .............. 379/433.07; 379/433.06

(58) Field of Classification Search ......... 379/433.06, 379/433.07, 433.01; 345/168–171; 341/21, 341/22; 361/680; 400/472, 485, 489
See application file for complete search history.

(56) References Cited

U.S. PATENT DOCUMENTS

| | | | | |
|---|---|---|---|---|
| 5,359,658 A | * | 10/1994 | Goodson | 379/447 |
| 6,992,658 B2 | * | 1/2006 | Wu et al. | 345/169 |
| 2003/0121964 A1 | * | 7/2003 | Crisan | 235/60 R |
| 2003/0161672 A1 | * | 8/2003 | Roberson | 400/490 |
| 2003/0235452 A1 | * | 12/2003 | Kraus et al. | 400/472 |

* cited by examiner

*Primary Examiner*—Curtis Kuntz
*Assistant Examiner*—Tuan Duc Nguyen

(57) ABSTRACT

A space-efficient ergonomic telephony keypad is described which comprises three separate groups of four buttons collectively capable of performing twelve distinct electronic switch operations. Each button is formed for tactile operation. Each group has the four buttons positioned about equally around an imaginary central axis. And, each group of four buttons is positionally rotated about 45 degrees relative to the positioning of an adjacent group of four buttons.

19 Claims, 4 Drawing Sheets

SPACE-EFFICIENT ERGONOMIC TELEPHONY KEYPAD

REFERENCES TO RELATED APPLICATIONS

This application relates to, and is a continuation-in-part of U.S. patent application Ser. No. 10/751,084, filed on Jan. 2, 2004 now U.S. Pat. No. 6,948,869 entitled COMPACT ERGONOMIC TELEPHONY KEYPAD, also filed by the inventor herein.

FIELD OF THE INVENTION

The present invention relates to portable telecommunication devices such as cellular phones or messaging devices or combinations thereof.

BACKGROUND OF THE INVENTION

As telecommunication devices become smaller for improved portability, ergonomic problems arise with the smaller devices for the miniaturization of the user interface means, for example the buttons of a keypad. In particular the size of a keypad for dialing phone numbers is a major limiting factor in the miniaturization of portable telephony devices. As the industry moves towards smaller devices for enhanced portability, there has been a trend towards miniaturization of the traditional twelve button keypad and alternate dialing methods utilizing scrolling wheels, cursors, trackballs and virtual keypads. Applicant believes all of these methods present ergonomic and/or performance drawbacks.

SUMMARY OF THE INVENTION

The present invention involves a space-efficient ergonomic telephony keypad which comprises three separate groups of four buttons collectively capable of performing twelve distinct electronic switch operations. Each button is formed for tactile operation. Each group has the four buttons positioned about equally around an imaginary central axis. And, each group of four buttons is positionally rotated about 45 degrees relative to the positioning of an adjacent group of four buttons.

Recognizing the need to develop a smaller, user friendly telephony keypad, the following objectives are considered.

It is an important objective of the present invention to provide for a smaller telephony keypad, so as to provide for a smaller telephony device.

It is another important objective of the present invention to provide for a smaller telephony device, thereby providing the user with greater portability.

It is another important objective of the present invention to provide for optimum spacing and precision operation of the tactile buttons and switch operations.

It is another important objective of the present invention to provide for a telephony keypad that provides the user with tactile and touch sensitive switch operations and enhanced ergonomics.

It is another important objective of the present invention to provide for visual association by using strategically placed graphics to aid the user with individual switch operations.

It is another important objective of the present invention that it be commercially viable, simple in design, and cost efficient to manufacture.

DETAILED DESCRIPTION OF THE DRAWINGS

Figure 1:
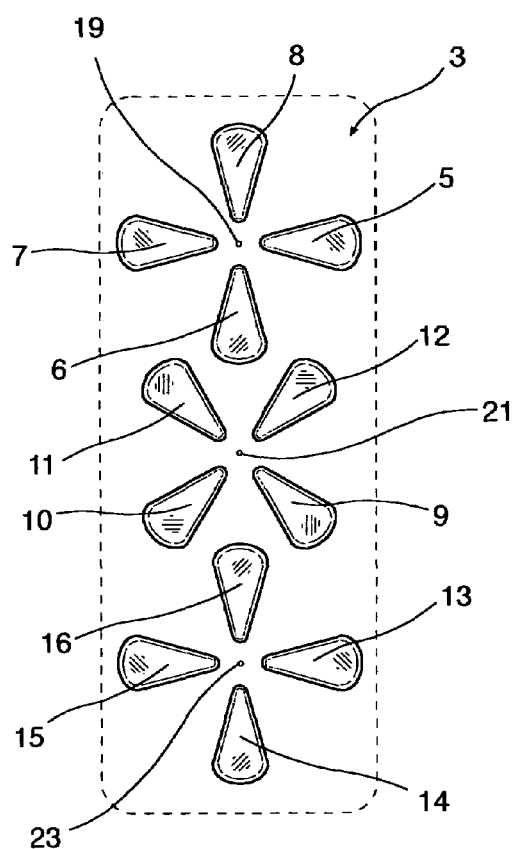
FIG. 1 shows a top view of an embodiment of the present invention space-efficient ergonomic telephony keypad.

Referring now to the drawings which are for the purpose of illustrating preferred embodiments of the present invention and not for the purpose of limiting same, FIG. 1 shows a top view of an embodiment of the present invention space-efficient ergonomic telephony keypad. Telephony keypad 3 is shown which comprises three separate groups of four buttons collectively capable of performing twelve distinct electronic switch operations. Four buttons 5, 6, 7, and 8 form a first group as shown; and, four buttons 9, 10, 11 and 12 form a second group of buttons as shown; and, buttons 13, 14, 15, and 16 form a third group of buttons as shown. Each of the twelve buttons shown is formed for tactile operation. In each group, the buttons are positioned around an imaginary central axis of the group with the four buttons spaced about equally apart around the imaginary central axis. For example, buttons 5, 6, 7 and 8 are positioned about equally apart around imaginary central axis 19. And, buttons 9, 10, 11 and 12 are positioned about equally apart around imaginary central axis 21. And, buttons 13, 14, 15 and 16 are positioned about equally apart around imaginary central axis 23. Also, each group of four buttons is positionally rotated about 45 degrees relative to the positioning of an adjacent group of four buttons. For example, first group of buttons 5, 6, 7 and 8 are postionally rotated about 45 degrees relative to the positioning of the adjacent group of buttons 9, 10, 11 and 12 as shown. Likewise, the group of buttons 9, 10, 11 and 12 are postionally rotated about 45 degrees relative to the positioning of the adjacent group of buttons 13, 14, 15 and 16 as shown. In some preferred embodiments of the present invention keypad, the spacing distance between any two adjacent buttons from a single group of buttons is about the same as the spacing distance between any two adjacent buttons from two separate adjacent groups of buttons. For example, the spacing distance between two adjacent buttons 5 and 6 from the same group of buttons, is about the same as the spacing distance between two adjacent buttons 6 and 12 from two separate adjacent groups. The spacing distance between two adjacent buttons from the same group of buttons, may be slightly more than or slightly less than the spacing distance between two adjacent buttons from two adjacent groups, however, in preferred embodiments the spacing is about the same. If the face of a keypad button does not have a predetermined depressible area as is the case in this FIG. 1, then the depressible area shall be considered to be generally at about the center of the button, from which the spacing distance is generally measured to another button.

Figure 2:
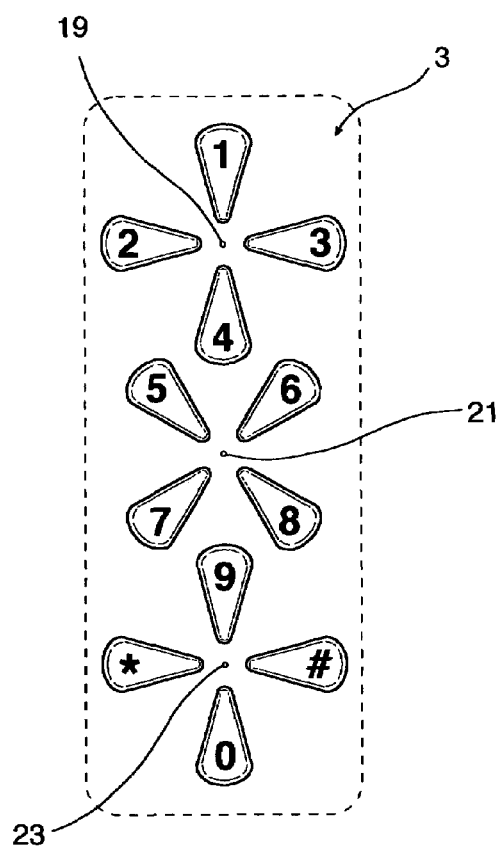
FIG. 2 shows a top view of the present invention shown in FIG. 1 with graphic identification for twelve switch operations.

FIG. 2 shows a top view of the present invention shown in FIG. 1 also including graphic identification for the twelve switch operations. Each of the twelve buttons shown is capable of performing at least one distinct switch operation as described above. Therefore, each button or an area proximate the button is marked with a distinct graphic identification marking as shown so that a user may easily select from at least twelve different switch operations in a compact ergonomic keypad.

Figure 3:
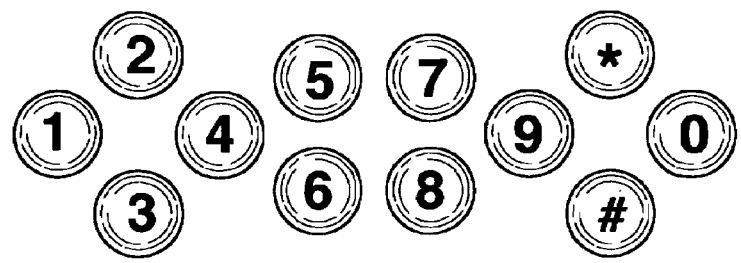
FIG. 3 shows a top view of another embodiment of the present invention space-efficient ergonomic telephony keypad.

FIG. 3 shows a top view of another embodiment of the present invention space-efficient compact ergonomic telephony keypad. In this Figure there are three groups of four, round buttons.

Figure 4:
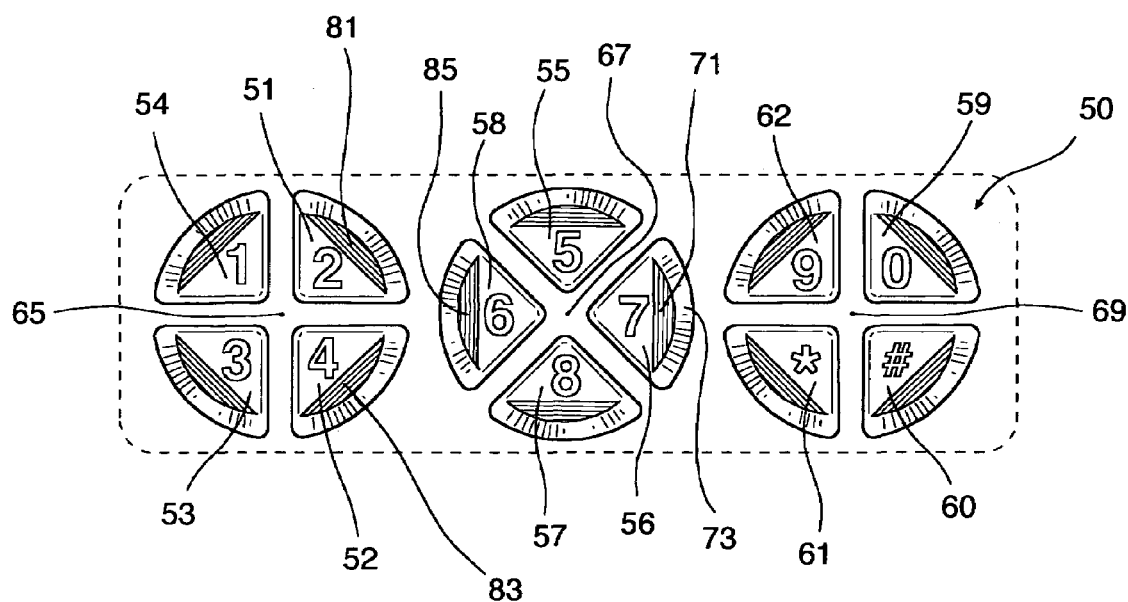
FIG. 4 shows a top view of another embodiment of the present invention space-efficient ergonomic telephony keypad.

FIG. 4 shows a top view of another embodiment of the present invention space-efficient ergonomic telephony keypad. Telephony keypad 50 is shown which comprises three separate groups of four buttons collectively capable of performing twelve distinct electronic switch operations. Four buttons 51, 52, 53 and 54 form a first group as shown; and, four buttons 55, 56, 57 and 58 form a second group of buttons as shown; and, buttons 59, 60, 61 and 62 form a third group of buttons as shown. Each of the twelve buttons shown is formed for tactile operation. In each group, the buttons are positioned around an imaginary central axis of the group with the four buttons spaced about equally apart around the imaginary central axis. For example, buttons 51, 52, 53 and 54 are positioned about equally apart around imaginary central axis 65. And, buttons 55, 56, 57 and 58 are positioned about equally apart around imaginary central axis 67. And, buttons 59, 60, 61 and 62 are positioned about equally apart around imaginary central axis 69. Also, each group of four buttons is positionally rotated about 45 degrees relative to the positioning of an adjacent group of four buttons. For example, first group of buttons 51, 52, 53 and 54 are postionally rotated about 45 degrees relative to the positioning of the adjacent group of buttons 55, 56, 57 and 58 as shown. Likewise, the group of buttons 55, 56, 57 and 58 are postionally rotated about 45 degrees relative to the positioning of the adjacent group of buttons 59, 60, 61 and 62 as shown. In the embodiment of the present invention shown in this Figure, each button is formed being tiltable away from the imaginary central axis of the group. For example, a user would push button 56 at the predetermined depressible area 71 causing button 56 to tilt down and slightly away from imaginary axis 67, causing the intended electronic switch operation to occur. The other buttons of the keypad would also be operated in the same manner. Another feature of the present invention shown in this FIG. 4 is that each button is formed with an area that is structurally raised to aid a user with tactile feel and operation. For example, button 56 has raised area 73 as shown which is representative of the other buttons as well. Since each button has a predetermined depressible area, the spacing distance between any two adjacent depressible areas from a single group of buttons is about the same as the spacing distance between any two adjacent depressible areas from two separate adjacent groups of buttons. For example, the spacing distance between depressible area 81 of button 51 and depressible area 83 of button 52 is about the same as the spacing distance between depressible area 83 of button 52 and depressible area 85 of button 58. Accordingly as is shown in this FIG. 4, some keypad buttons are formed with a predetermined depressible area that is not at the center of the button. Yet in some other embodiments of the present invention as shown in FIGS. 1, 2 and 3 the keypad buttons may not have a predetermined depressible area other than the center of the button or entire face of the button.

Figure 5:
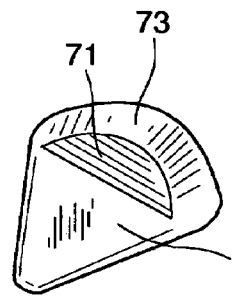
FIG. 5 shows a closer view of a single button from the keypad shown in FIG. 4.

FIG. 5 shows a larger view of individual button 56 from the present invention keypad 50 shown in FIG. 4. Button 56 has structurally raised area 73 and a predetermined depressible area 71 as shown. The structurally raised area 73 tapers away from an imaginary centerline of the button (not shown) and towards each side of the button to enhance ergonomics and user tactile operation. Although the buttons shown in FIGS. 1, 2, 3, 4 and 5 are each individually formed, a present invention keypad could easily comprise an overly material formed to include all the buttons therein. Such an embodiment would not depart from the scope of this invention.

Figure 6:
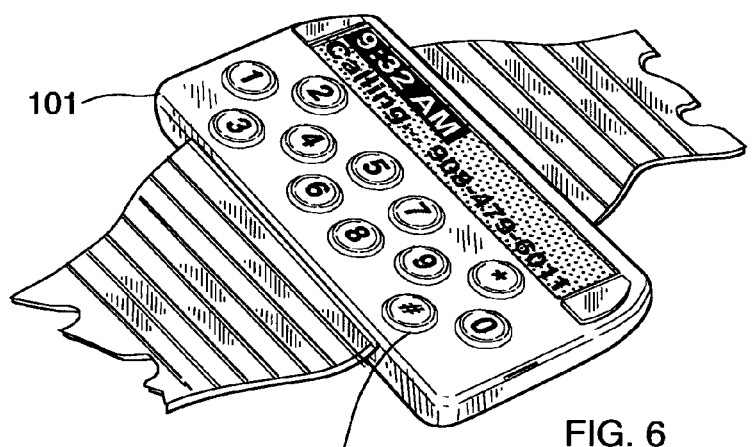
FIG. 6 shows a perspective view of a wrist mountable telephony device comprising an embodiment of the present invention space-efficient compact ergonomic telephony keypad.

FIG. 6 shows a perspective view of a wrist mountable telephony device 101 comprising an embodiment of the present invention space-efficient compact ergonomic telephony keypad 103.

Figure 7:
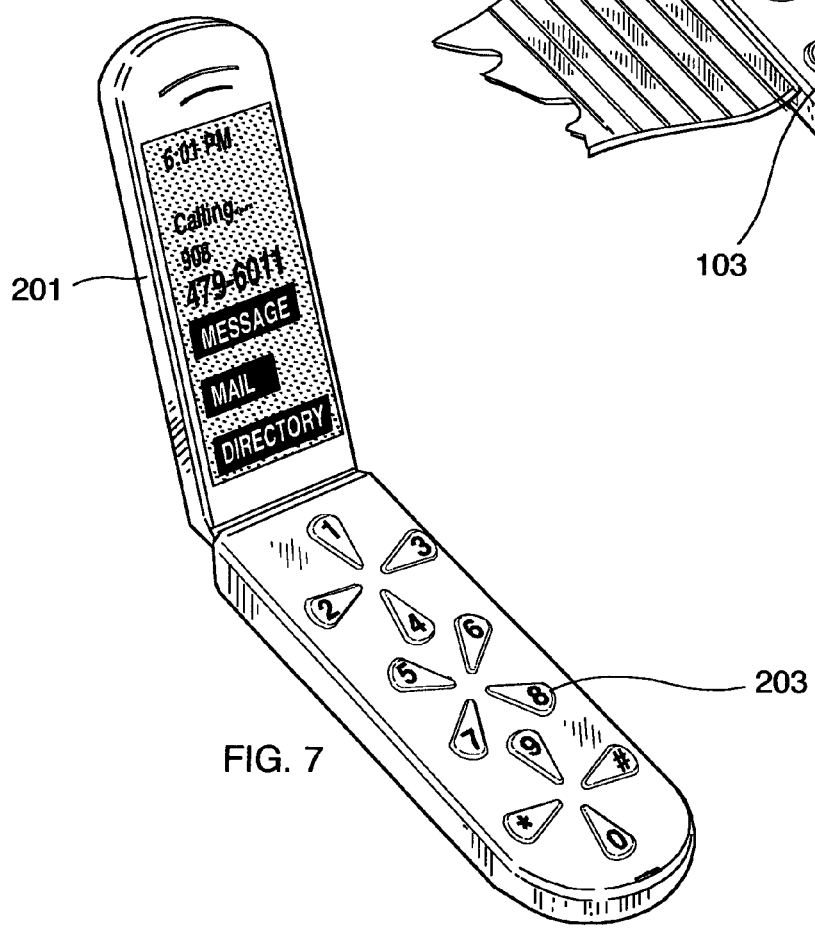
FIG. 7 shows a perspective view of handheld telephony device comprising an embodiment of the present invention space-efficient ergonomic telephony keypad.

FIG. 7 shows a perspective view of handheld telephony device 201 comprising an embodiment of the present invention space-efficient ergonomic telephony keypad 203.

Figure 8:
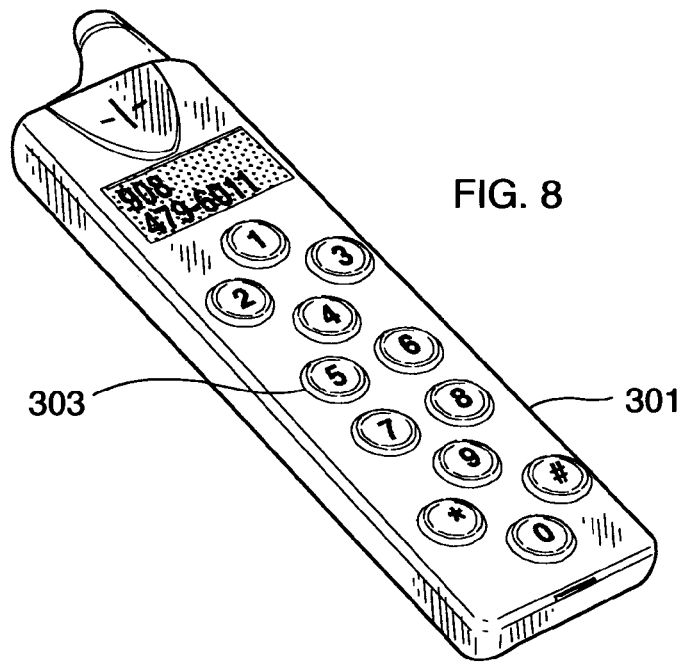
FIG. 8 shows a perspective view of another handheld telephony device comprising an embodiment of the present invention space-efficient ergonomic telephony keypad.

FIG. 8 shows a perspective view of another handheld telephony device 301 comprising an embodiment of the present invention space-efficient ergonomic telephony keypad 303.

Figure 9:
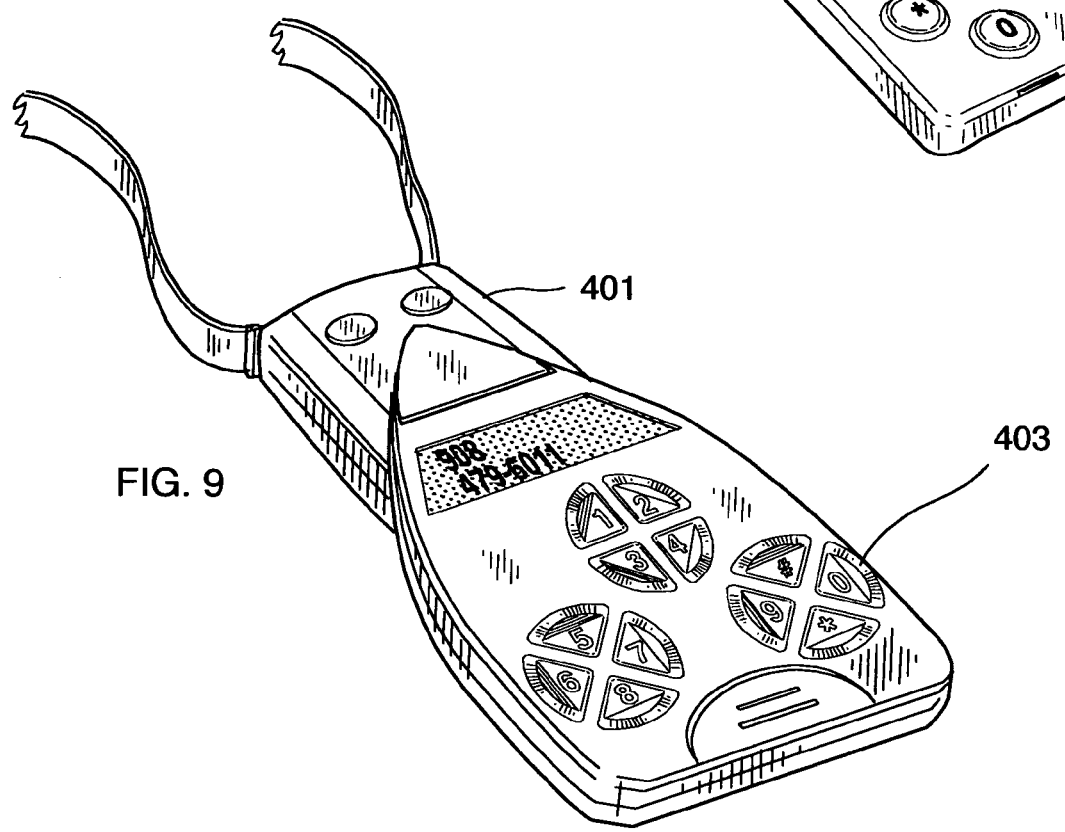
FIG. 9 shows a perspective view of another telephony device worn by a user as a pendant, comprising an embodiment of the present invention space efficient ergonomic telephony keypad.

FIG. 9 shows a perspective view of another telephony device 401 comprising an embodiment of the present invention space-efficient ergonomic telephony keypad 403.

Upon reading and understanding the specification of the present invention described above, modifications and alterations will become apparent to those skilled in the art. It is intended that all such modifications and alterations be included insofar as they come within the scope of the patent as claimed or the equivalence thereof.

The invention claimed is:

1. A compact, ergonomic telephony keypad comprising three separate groups of four buttons collectively capable of performing twelve distinct electronic switch operations; each said button being formed for tactile operation, each said group having said four buttons positioned about equally apart around an imaginary central axis, and, each said group of four buttons being positionally rotated about 45 degrees relative to the positioning of an adjacent group of four buttons.

2. A telephony keypad of claim 1, wherein the spacing distance between any two adjacent buttons from a single group of buttons is about the same as the spacing distance between any two adjacent buttons from two separate adjacent groups of buttons.

3. A telephony keypad of claim 1, wherein each said button is formed being tiltable away from said imaginary central axis.

4. A telephony keypad of claim 1, wherein each said button has an area which is structurally raised to aid a user with said tactile operation.

5. A telephony key pad of claim 1, wherein said telephony keypad comprises an overlay material having said three groups of four buttons formed therein.

6. A telephony keypad of claim 2, wherein each said button is formed being tiltable away from said imaginary central axis.

7. A telephony keypad of claim 2, wherein each said button has an area which is structurally raised to aid a user with said tactile operation.

8. A telephony key pad of claim 2, wherein said telephony keypad comprises an overlay material having said three groups of four buttons formed therein.

9. A telephony keypad of claim 3, wherein each said button has an area which is structurally raised to aid a user with said tactile operation.

10. A telephony key pad of claim 3, wherein said telephony keypad comprises an overlay material having said three groups of four buttons formed therein.

11. A telephony keypad of claim 4, wherein each said button has an imaginary centerline, and the raised area of each said button is formed tapering away from said centerline.

12. A compact, ergonomic telephony keypad comprising three separate groups of four buttons collectively capable of performing twelve distinct electronic switch operations; each said button being formed for tactile operation, each said group having said four buttons positioned about equally apart around an imaginary central axis, each said group of four buttons being positionally rotated about 45 degrees relative to the positioning of an adjacent group of four buttons, and further wherein, each said button having a predetermined depressible area, and the spacing distance between any two adjacent depressible areas from a single group of buttons being about the same as the spacing distance between any two adjacent depressible areas from two separate adjacent groups of buttons.

13. A telephony keypad of claim 12, wherein each said button is formed being tiltable away from said imaginary central axis.

14. A telephony keypad of claim 12, wherein each said button has an area which is structurally raised to aid a user with said tactile operation.

15. A telephony key pad of claim 12, wherein said telephony keypad comprises an overlay material having said three groups of four buttons formed therein.

16. A telephony keypad of claim 13, wherein each said button has an area which is structurally raised to aid a user with said tactile operation.

17. A telephony key pad of claim 13, wherein said telephony keypad comprises an overlay material having said three groups of four buttons formed therein.

18. A telephony key pad of claim 14, wherein said telephony keypad comprises an overlay material having said three groups of four buttons formed therein.

19. A telephony keypad of claim 14, wherein each said button has an imaginary centerline, and the raised area of each said button is formed tapering away from said centerline.

* * * * *